United States Patent
Helmstädter et al.

(10) Patent No.: US 6,695,114 B2
(45) Date of Patent: Feb. 24, 2004

(54) MULTI-DISK CLUTCH

(75) Inventors: Karl-Heinz Helmstädter, Heidelberg (DE); Christian Görbing, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/078,114

(22) Filed: Feb. 19, 2002

(65) Prior Publication Data

US 2002/0112935 A1 Aug. 22, 2002

(30) Foreign Application Priority Data

Feb. 19, 2001 (DE) .......................... 101 07 715

(51) Int. Cl.$^7$ ................................ F16D 13/68
(52) U.S. Cl. .................... 192/70.18; 192/70.2
(58) Field of Search ............ 192/70.17, 70.18, 192/70.19, 70.2; 271/902; 74/439

(56) References Cited

U.S. PATENT DOCUMENTS

| | | | | | |
|---|---|---|---|---|---|
| 1,328,022 A | * | 1/1920 | Watson | ................... | 192/70.13 |
| 1,467,732 A | * | 9/1923 | Litle, Jr. | ..................... | 192/207 |
| 4,787,261 A | * | 11/1988 | Becker | ........................ | 74/439 |
| 5,048,362 A | * | 9/1991 | Becker et al. | ................. | 74/439 |
| 5,653,321 A | * | 8/1997 | Takaoka et al. | ......... | 192/70.17 |
| 5,765,673 A | * | 6/1998 | Nishiyama et al. | ..... | 192/85 AA |

FOREIGN PATENT DOCUMENTS

| | | | | |
|---|---|---|---|---|
| EP | 0 346 619 A2 | | 12/1989 | |
| JP | 04107324 A | * | 4/1992 | ....... F16D/25/0638 |

* cited by examiner

*Primary Examiner*—Richard M. Lorence
(74) *Attorney, Agent, or Firm*—Laurence A. Greenberg; Werner H. Stemer; Ralph E. Locher

(57) ABSTRACT

A device for positively coupling one force transmission element with a further force transmission element includes a multi-disk clutch formed of at least four disk rings for adjusting the rotary position of the further transmission element in relation to the one force transmission element, the disk rings being axially displaceably mounted and, for both directions of rotation, having a play-free operative connection with the force transmission elements.

14 Claims, 8 Drawing Sheets

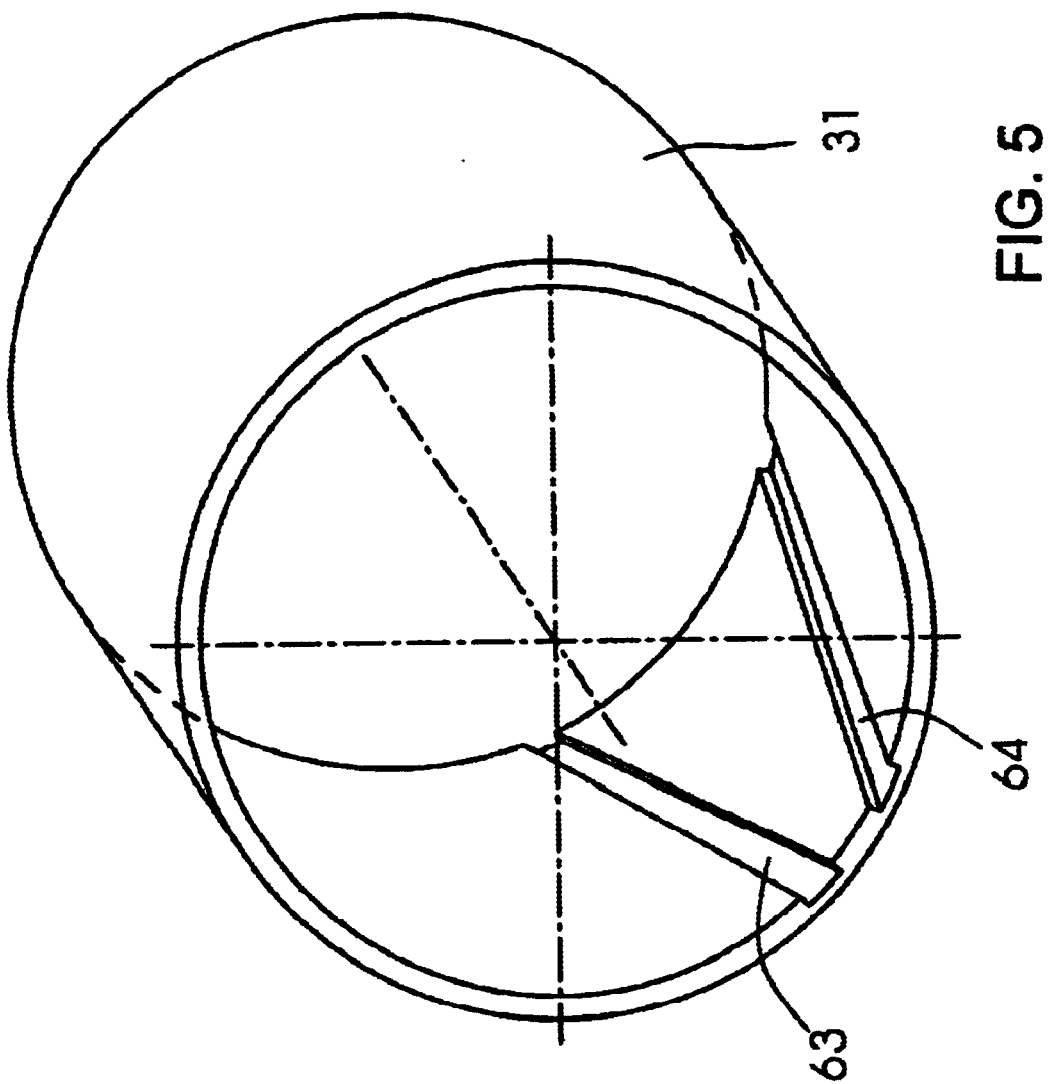

MULTI-DISK CLUTCH

BACKGROUND OF THE INVENTION

FIELD OF THE INVENTION

The invention relates to a device for adjusting a rotary position of a ring gear in relation to an axially aligned gearwheel.

In reversing or turning devices in rotary printing machines, it has become known heretofore that the gripper devices of the reversing or turning device which grip the trailing edge of the sheet during the reversing or turning operation have to be adjusted as a function of the operating mode and of the format length to be processed.

For this purpose, a cylinder of the reversing or turning device has a gearwheel which is drive-connected to the preceding printing units of a first gearwheel train. The cylinder wheel carries, axially aligned, a ring gear which is drive-connected to the following printing units by a second gearwheel train. The gearwheel and the ring gear are releasably coupled to one another.

A device of this general type has become known heretofore, for example, from the published European Patent Document EP 0 346 619 A1, which discloses, for forcelocking or nonpositive coupling of the gearwheel and the ring gear, a multi-disk clutch, wherein a number of annular coaxially arranged disks are attached resiliently to the gearwheel and a number of annular coaxially arranged disks cooperating with the first disks are screwed resiliently to the ring gear. In this regard, it is noted that a forcelocking connection is one that connects two elements together by force external to the elements, as opposed to a formlocking connection, which is provided by the shapes of the elements themselves.

In the aforementioned published European Patent Document EP 0 346 619 A1, the fastening points for the disks are disclosed as being exposed to high loads in the case of high transmission forces and, therefore, having to be constructed with very high dimensioning.

SUMMARY OF THE INVENTION

It is accordingly an object of the invention to provide an alternative multi-disk clutch, which avoids the disadvantages of heretoforeknown clutches of this general type.

With the foregoing and other objects in view, there is thus provided, in accordance with one aspect of the invention, a device for positively coupling one force transmission element with a further force transmission element, comprising a multi-disk clutch formed of at least four disk rings for adjusting the rotary position of the further transmission element in relation to the one force transmission element, the disk rings being axially displaceably mounted and, for both directions of rotation, having a play-free operative connection with the force transmission elements.

In accordance with another feature of the invention, the coupling device includes a gearwheel having a journal extension and, on a seating surface in common with an adjusting gearwheel, has a receptacle for some of the disk rings, and a receptacle for others of the disk rings.

In accordance with a further feature of the invention, each of the disk rings has at least one driver.

In accordance with an additional feature of the invention, some of the drivers of the disk rings are directed radially inwardly, and some of the drivers of the disk rings are directed radially outwardly.

In accordance with yet another feature of the invention, the radially inwardly directed drivers engage in an axially parallel receptacle in the journal extension, and the radially outwardly directed drivers engage in an axially parallel receptacle in a ring gear.

In accordance with yet a further feature of the invention, some of the drivers of some of the disk rings engage in an axially parallel receptacle in the journal extension, and some of the drivers of others of the disk rings engage in the axially parallel receptacle in a ring gear.

In accordance with yet an added feature of the invention, others of the drivers of others of the disk rings engage in the axially parallel receptacle in the journal extension, and others of the drivers of others of the disk rings engage in the axially parallel receptacle in the ring gear.

In accordance with yet an additional feature of the invention, the drivers directed radially inwardly engage, respectively, in two threaded receptacles in the journal extension, and the drivers directed radially outwardly engage, respectively, in two threaded receptacles in the ring gear.

In accordance with still another feature of the invention, two drivers arranged opposite one another are provided for each of the disk rings, each of the two drivers having a starting slope.

In accordance with still a further feature of the invention, the two drivers engage in two opposite receptacles in the ring gear, and the two drivers engage in two receptacles in the journal extension.

In accordance with still an added feature of the invention, some of the disk rings are arranged so as to be shiftable independently of one another for a clockwise direction of rotation, and some of the disk rings are arranged so as to be shiftable independently of one another for a counterclockwise direction of rotation.

In accordance with still an additional feature of the invention, the coupling device includes an abutment arranged between the disk rings for clockwise rotational force transmission and the disk rings for counterclockwise rotational force transmission, and clamping devices operating independently of one another for shifting the various disk assemblies.

In accordance with another feature of the invention, the coupling device includes spring elements disposed in the receptacles for augmenting the bearing contact of the drivers.

In accordance with a further feature of the invention, the spring elements are selected from the group thereof consisting of compression springs, leaf springs, magnets, plastic material and rubber.

In accordance with a concomitant aspect of the invention, there is provided a reversing device of a sheet-fed rotary printing machine having installed therein a device for positively coupling one force transmission element with a further force transmission element, comprising a multi-disk clutch formed of at least four disk rings for adjusting the rotary position of the further transmission element in relation to the one force transmission element, the disk rings being axially displaceably mounted and, for both directions of rotation, having a play-free operative connection with the force transmission elements.

An advantage of the invention is that, due to the location of installation and type of installation of the multi-disk clutch according to the invention, positive force transmission from gearwheel to disk and from disk to ring gear is possible, even in the case of high torques.

To achieve reliable bearing contact (freedom from play and high torsional rigidity) of the elements involved in force transmission, provision is made for arranging axially displaceable disk rings on a journal extension of the gearwheel. These can have a great thickness, and therefore high torsional rigidity, as compared with the conventional flexible disks. Each disk ring has at least one driver which, respectively, engages in a receptacle formed, for example, as a groove. For the play-free transmission of a torque, two different disk rings are necessary for each direction of rotation, more precisely, a first disk ring with an external driver for engaging in the ring gear, and a second disk ring with an internal driver for engaging in the gearwheel or journal extension.

In a preferred embodiment, a number of, for example four disk rings, are arranged as an assembly for torque transmission clockwise and a number of, for example four disk rings, are arranged as a further assembly for torque transmission counterclockwise, the drivers of the disk assemblies, respectively, having to be brought into bearing contact with respective receptacles. At the same time, for the elimination of play, provision is made for arranging in the receptacles elastic spring elements which ensure that the drivers or entrainers are in constant bearing contact on the working side of the receptacle. Mechanical springs, magnets, plastic materials or rubber, and the like are preferably proposed for this purpose. In the preferred exemplary embodiment, each disk ring has three drivers which are arranged at an angle of 120° to one another, respectively, and engage with assembly play in the receptacles, in order, in addition to the transmission of a torque, to prevent a displacement of the ring gear due to the tooth forces.

In a further exemplary embodiment, provision is made for ensuring good reliable bearing contact, as free of play as possible, of the drivers in the receptacles by at least two receiving grooves being arranged with slight rifling, i.e., with a slight curvature in the journal receptacle or with opposite curvatures in the ring gear. This measure ensures that, during the closing of the clutch, the drivers provided for torque transmission are brought into bearing contact with the receptacles.

If, in a further development, the radial play is additionally to be forced out during the closing of the clutch made up of the elements transmitting rotational force, provision is made, in order to absorb the displacement forces on the ring gear, for respectively providing two receptacles per ring gear or per journal extension preferably opposite one another and for providing both the drivers and the receptacles with a radially arranged starting or run-on slope.

In the preferred exemplary embodiment, each disk ring has three drivers which are arranged at an angle of 120° to one another, respectively, and which engage with assembly play in the receptacles.

Other features which are considered as characteristic for the invention are set forth in the appended claims.

Although the invention is illustrated and described herein as embodied in a multi-disk clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 5 is a diagrammatic perspective view of a ring gear with receptacles therein;

DESCRIPTION OF THE PREFERRED EMBODIMENTS

Figure 1:
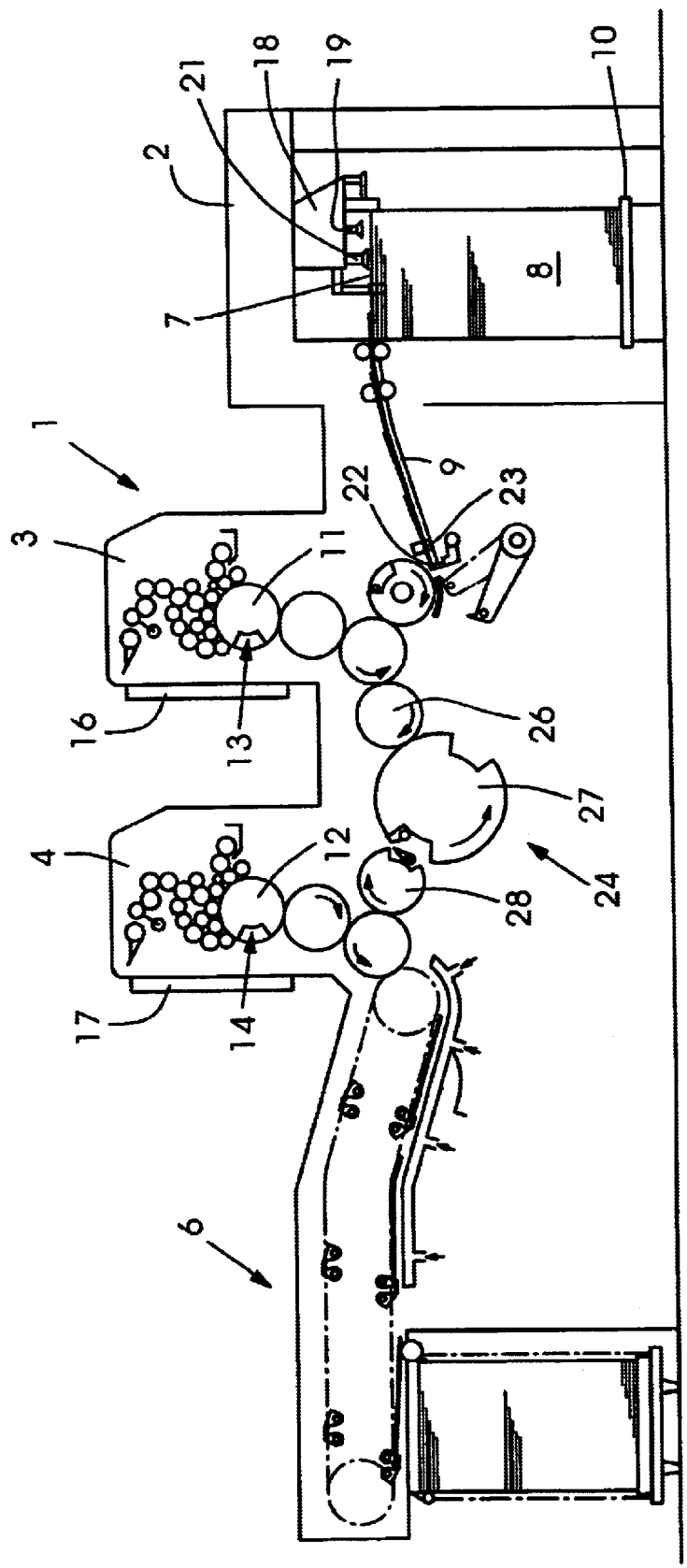
FIG. 1 is a diagrammatic side elevational view of a rotary printing machine incorporating the multi-disk clutch according to the invention.
Figure 2:
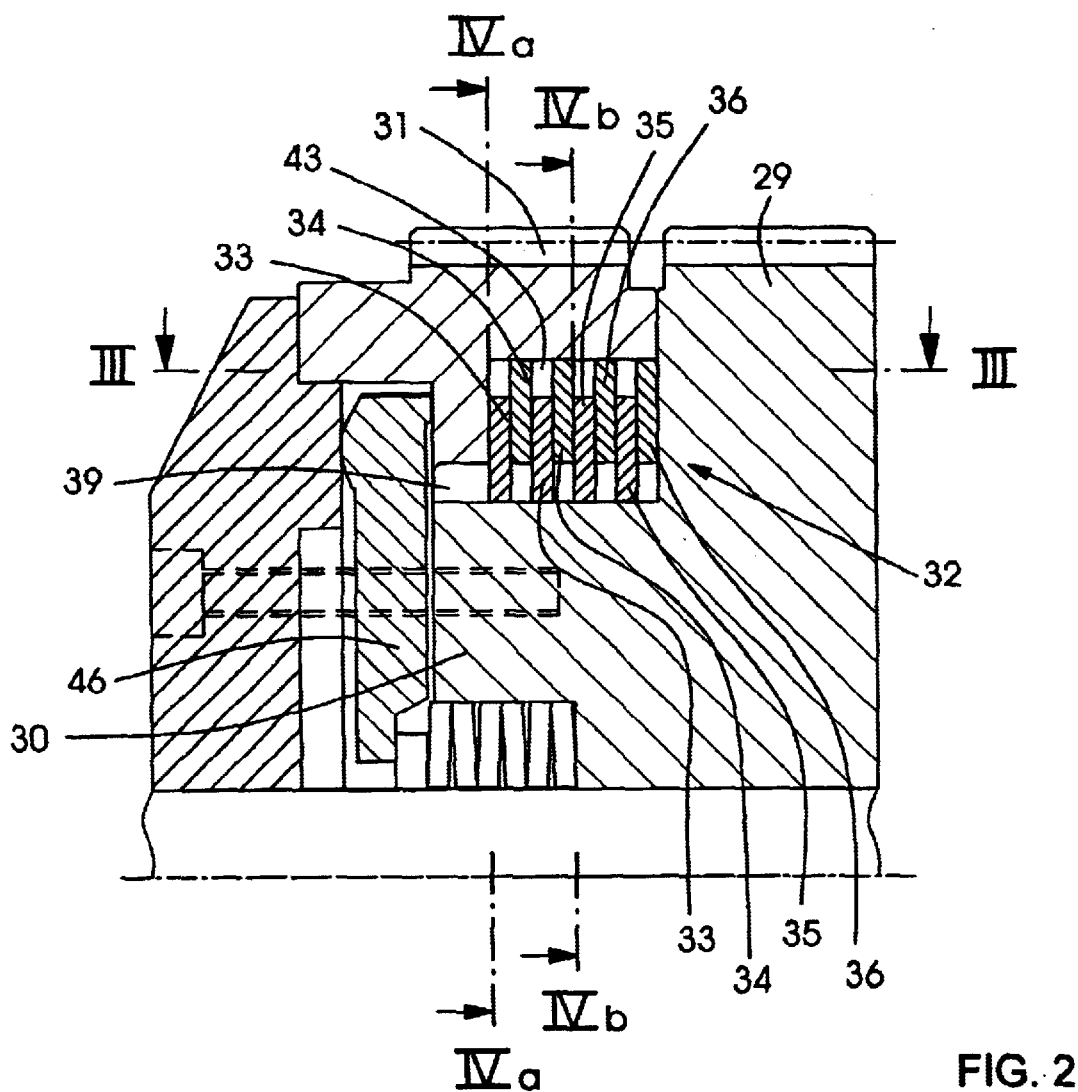
FIG. 2 is an enlarged fragmentary sectional view of FIG. 1 showing the multi-disk clutch according to the invention in greater detail diagrammatically.
Figure 3:
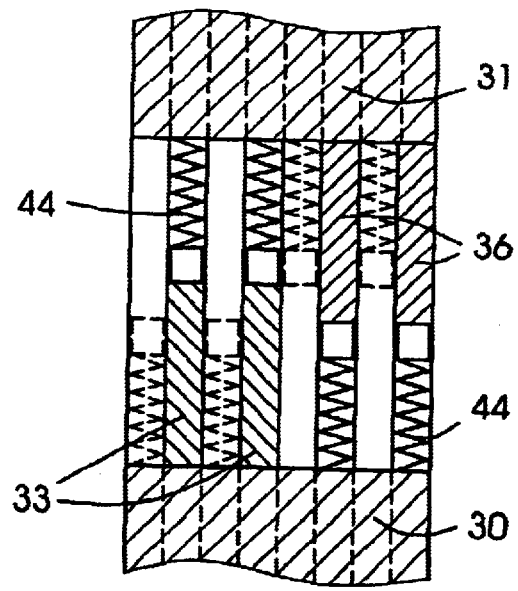
FIG. 3 is an enlarged sectional view of FIG. 2 taken along the line III—III in the direction of the arrows and showing diagrammatically a section through external and internal disks.
Figure 4A:
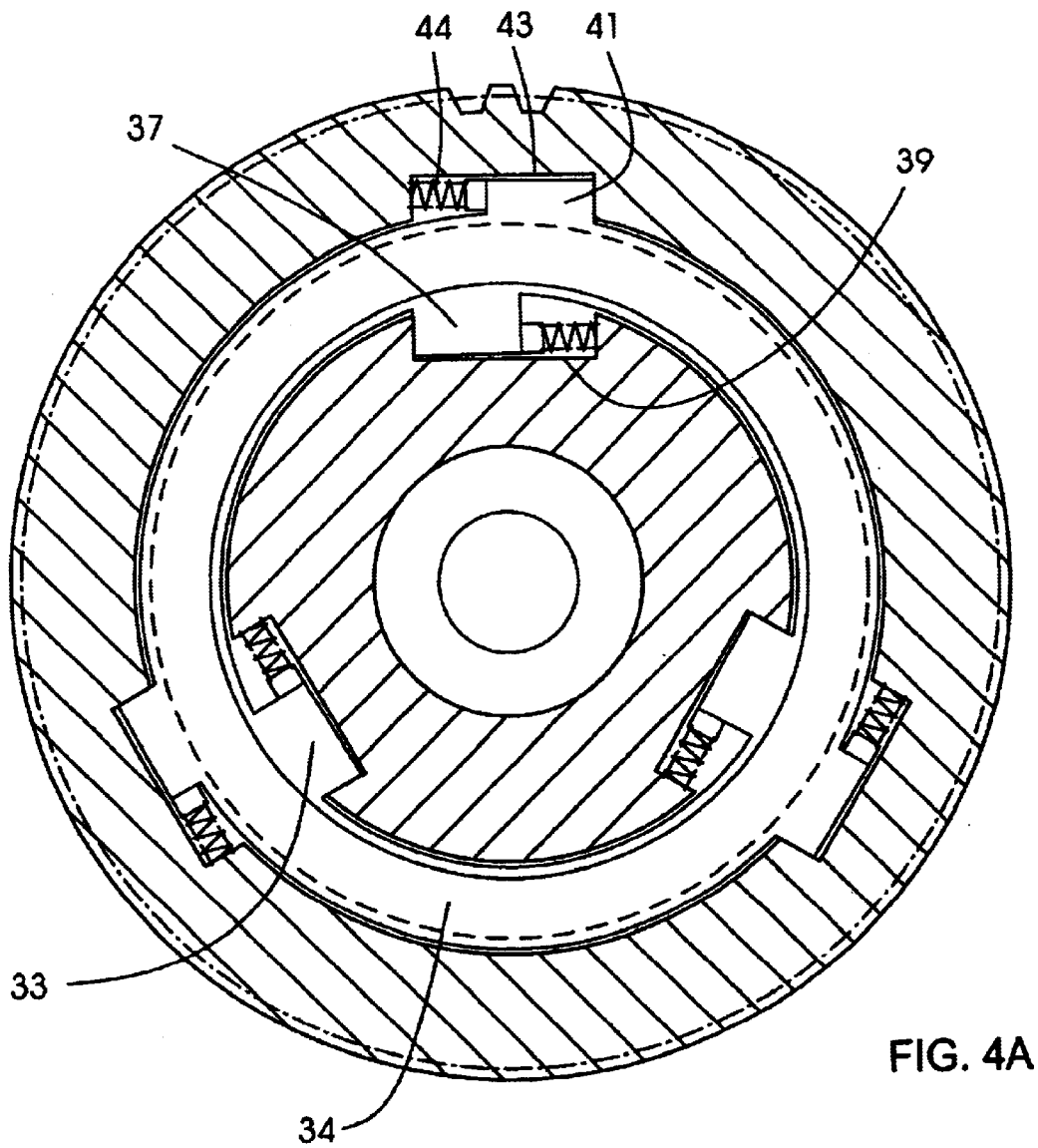
FIG. 4a is a sectional view of FIG. 2 taken along the line IVa—IVa in the direction of the arrows.
Figure 4B:
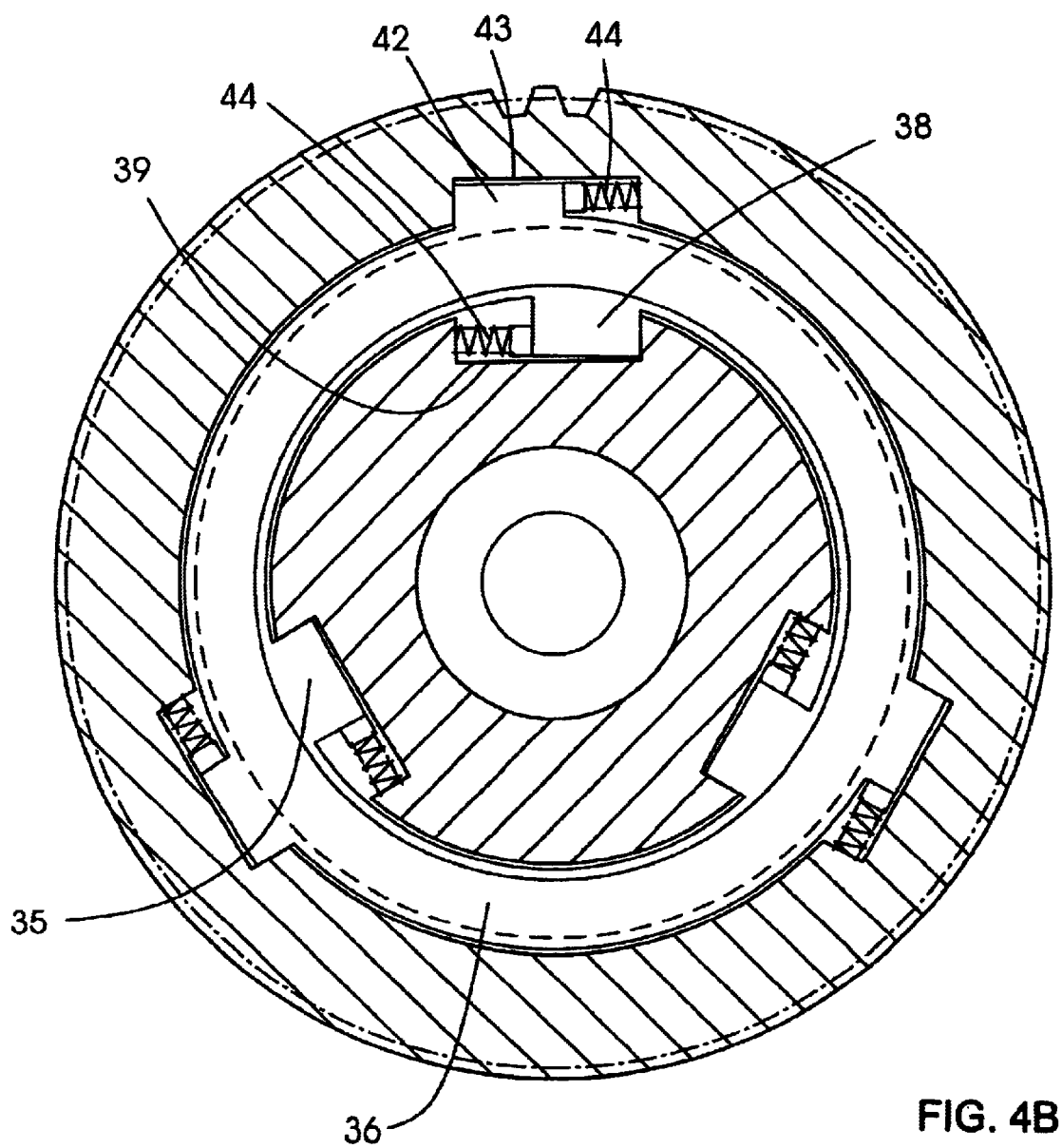
FIG. 4b is a sectional view of FIG. 2 taken along the line IVb—IVb in the direction of the arrows.
Figure 6:
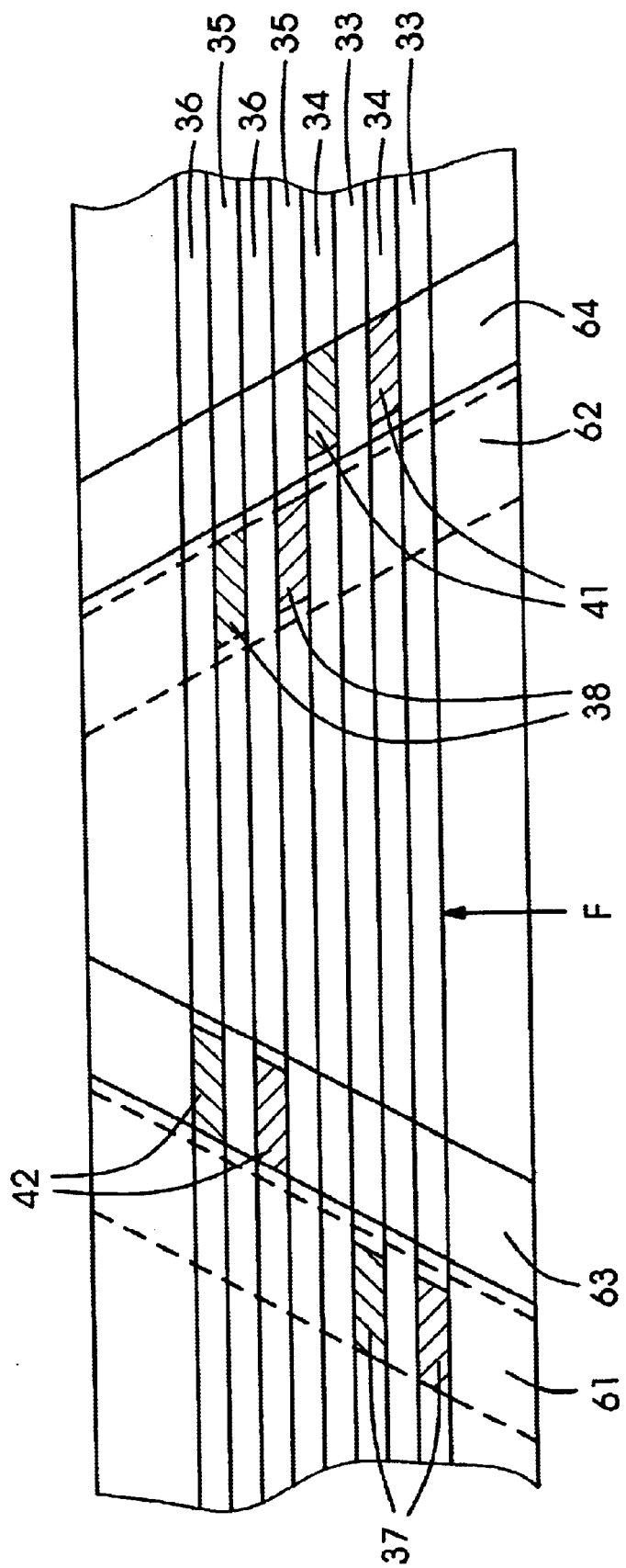
FIG. 6 is a fragmentary diagrammatic developed view of the ring gear and a journal extension.
Figure 8:
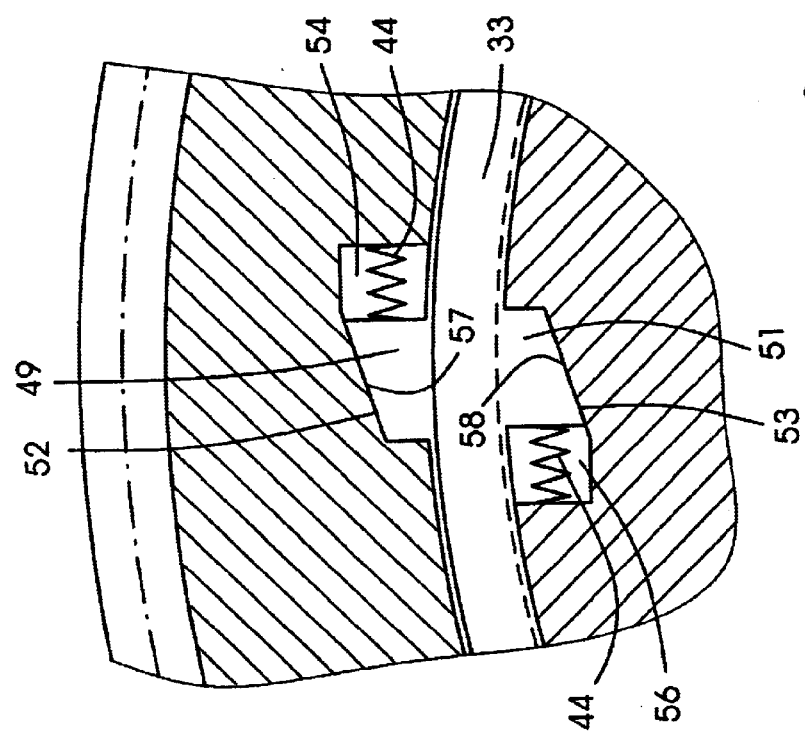
FIG. 8 is a fragmentary diagrammatic sectional view of the positive or formlocking connection between the entrainer and the receptacle with a starting slope.
Figure 7:
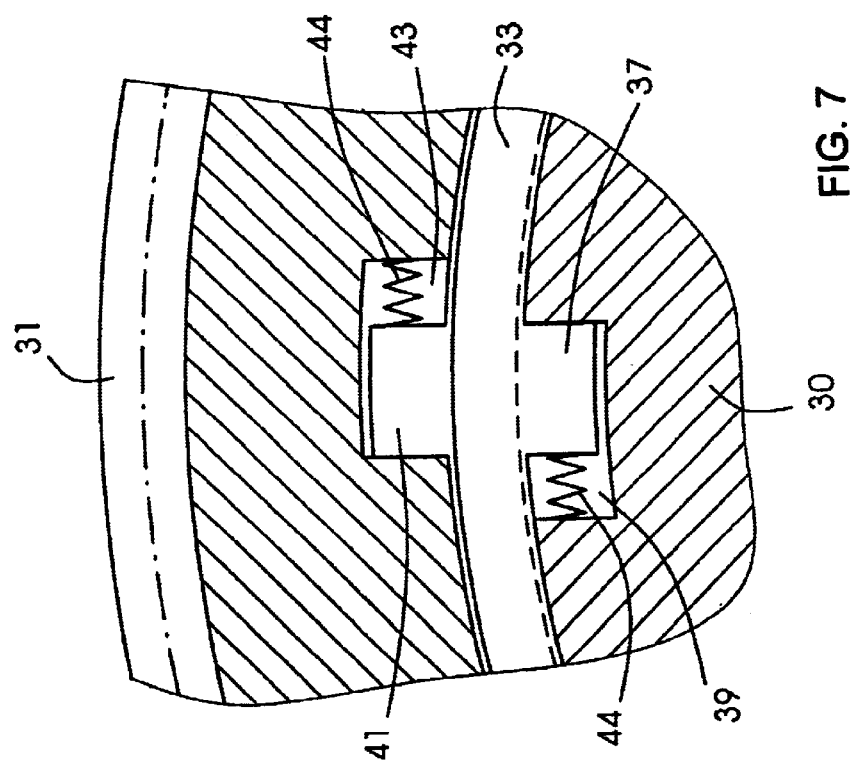
FIG. 7 is a fragmentary diagrammatic sectional view of a formlocking or positive connection between an entrainer and a receptacle, it being noted in this regard that a formlocking connection is one that connects two elements together due to the shape of the elements themselves, as opposed to a forcelocking connection, which locks the elements together by force external to the elements.

Referring now to the drawings and, first, particularly to FIG. 1 thereof, there is shown therein a rotary printing machine, for example, a printing machine 1 for processing sheets 7, having a feeder 2, at least one printing unit 3 or 4 and a delivery 6. The sheets 7 are removed from a sheet pile 8 and are fed individually or in an imbricated manner via a feeding table 9 to the printing units 3 and 4, each of which has a plate cylinder 11, 12, respectively. Each of the plate cylinders 11 and 12 has a device 13, 14 for fastening flexible printing plates thereon. Furthermore, to each plate cylinder 11, 12 there is assigned a device 16, 17 for semiautomatically or fully automatically changing a printing plate.

The sheet pile 8 lies on a pile or stack plate 10 capable of being raised in a controlled manner. The removal of the sheets 7 takes place from the upper side of the sheet pile 8 by a so-called suction head 18 which has, amongst others, a number of lifting or dragging suckers 19, 21 for individually separating or singling the sheets 7. Moreover, blowing or blast devices 22 for loosening the upper sheet layers, and tracer elements 23 for pile or stack tracking are provided. A number of lateral and rear stops are provided for aligning the sheet pile 8, in particular, the upper sheets 7 of the sheet pile 8.

Between the printing units 3 and 4, there is arranged a reversing or turning device 24 which, in the exemplary embodiment, is made up of a transfer cylinder 26, a storage drum 27 and a reversing or turning drum 28. The reversing or turning drum 28, in this regard, has a driving gearwheel 29 which is in meshing engagement with the gearwheel train of the preceding cylinders. The driving gearwheel 29 carries, on a journal extension 30, a rotatably mounted ring gear 31 which is in meshing engagement with the gearwheel train of the following cylinders and printing units, respectively. The ring gear 31 can be coupled frictionally with respect to the gearwheel 29 by a multi-disk clutch 32. The multi-disk clutch 32 is formed mainly of a number of disk rings 33 to 36, which are axially displaceably arranged.

The disk rings 33, 35 have at least one radially inwardly-directed driver 37, 38 which engages in at least one groove-shaped receptacle 39 of the journal extension 30 of the gearwheel 29. The disk rings 34, 36 have at least one radially outwardly-directed driver 41, 42 which engages in at least one groove-shaped receptacle 43 in the ring gear 31. The disk rings are combined in pairs or as an assembly for force transmission in one direction of rotation, for example, the disk rings 33 and 34 for a counterclockwise direction of rotation and the disk rings 35 and 36 for force transmission in a clockwise direction of rotation.

In an arrangement in pairs, the disk rings 33, 34 for counterclockwise force transmission are, respectively, in frictional contact with the disk rings 35, 36 for clockwise force transmission. Depending upon the construction of the clutch, the number of disk ring pairs may be increased, these being arranged alternately, i.e., for example, 33, 34-35, 36-33, 34-35, 36.

To increase the transmission forces by an increase in the effective frictional surface, along with the same construction and number of disk rings, a packet or set-like arrangement or assembly is proposed. This results in an arrangement of the disk rings of 33, 34-33, 34-35, 36-35, 36.

So that the multi-disk clutch 32 operates free of play, provision is made for arranging in the receptacles 39, 43, 61 to 64 spring elements 44 which keep the respective entrainer or driver 37, 38, 41, 42 in constant bearing contact on the force transmission side of the receptacle 39, 41. The spring elements 44 which are used are magnets or compression springs or leaf springs which are supported at one end on the side located opposite from the force transmission side and at the other end on the driver or entrainer 37, 38, 41, 42 (rear side). Alternatively, elastic elements, such as of plastic material or rubber, may also be introduced into the space on the rear side of the driver or entrainer 37, 38, 41, 42.

In an alternative embodiment, it is possible to dispense with the use of spring elements if two oppositely directed groove-shaped receptacles are arranged askew (in a thread-like manner) to the axis of the journal extension 30 both in the ring gear 31 and in the journal extension 30. In this arrangement, two groove-shaped receptacles 61, 62 having opposite pitches are provided in the journal extension 30, and two groove-shaped receptacles 63, 64 having opposite pitches are provided in the toothed ring 31, and in this case the receptacles 61 and 63 and also 62 and 64 can be arranged in parallel. Thus, the drivers or entrainers 37 of the disk rings 33 engage in the receptacle 61 of the journal extension 30, and the drivers or entrainers 38 of the disk rings 35 engage in the receptacle 62 of the journal extension 30. The drivers or entrainers 41 of the disk rings 34 engage in the receptacle 64 of the toothed ring 31 and the drivers or entrainers 42 of the disk rings 36 engage in the receptacle 63 of the ring gear 31. The receptacles 61 to 64 describe a type of rifling with very high pitch.

During the clamping of the multi-disk clutch 32, an axial clamping force is applied by, for example, an hydraulically actuatable lever 46. In this regard, the disk rings 33 to 36 are displaced axially and at the same time come automatically with the drivers or entrainers thereof into bearing contact on the force-transmitting side of the receiving grooves 61 to 64 which are arranged askew. The tensioning travel is, in this regard (from the eased to the tensioned state), so that the flanks or sides come reliably into bearing contact.

Figure 9:
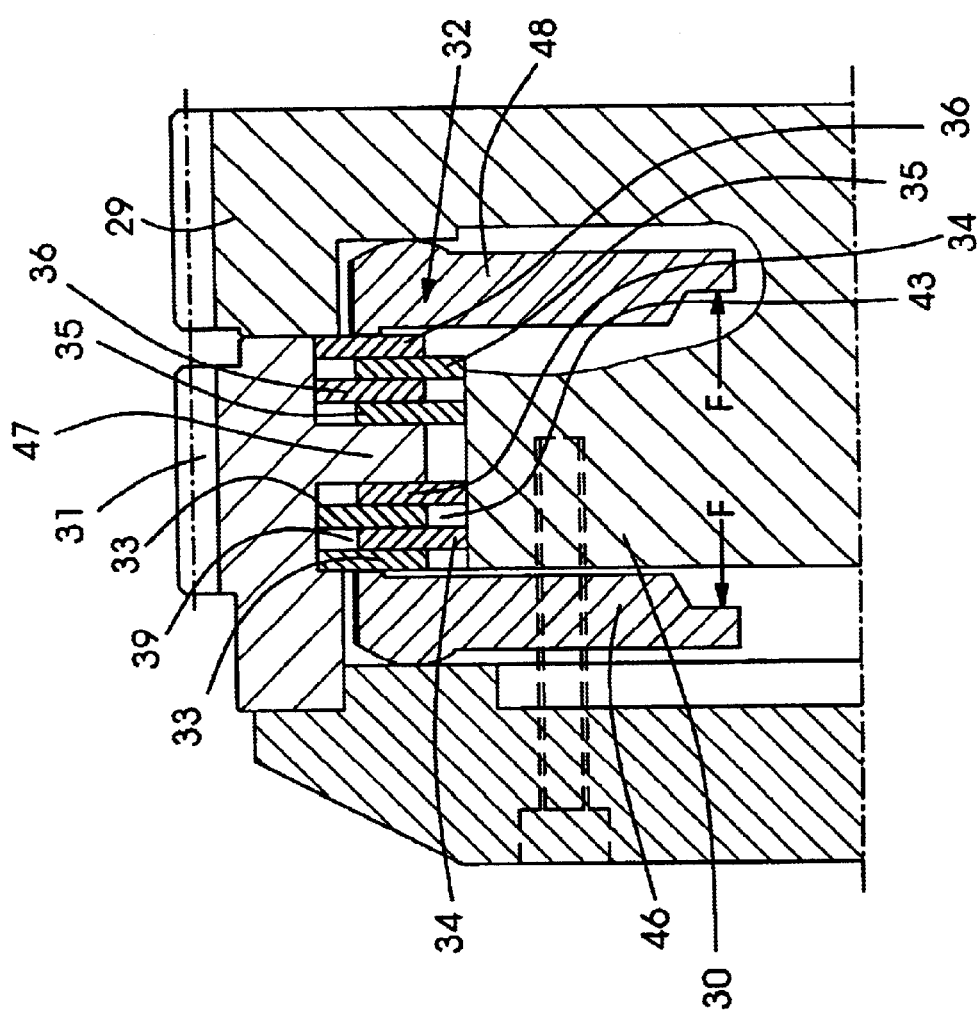
FIG. 9 is a view like that of FIG. 2 showing a section through a further exemplary embodiment of the multi-disk clutch with separately shiftable clutches for movement to the lefthand side and to the righthand side.

In a further exemplary embodiment according to FIG. 9, provision is made for arranging, between the disk assemblies 33, 34 for rotary transmission counterclockwise (movement to the lefthand side) and the disk assemblies 35, 36 for rotary transmission clockwise (movement to the righthand side), an abutment 47 which is fastened to the journal extension 30 and on which the disk assemblies come to bear when the multi-disk clutch 32 is in the closed state. A second, for example, hydraulically actuatable lever 48, in this regard, applies the clamping force for the disk assembly 35, 36 which can thus be actuated separately from the disk assembly 33, 34 for movement to the lefthand side.

So that radial play, too, between the drivers 39, 41 and the receptacles 29, 31 can be eliminated during the clamping of the multi-disk clutch 32, provision is made for each disk ring 33 to 36 to have at least two drivers or entrainers 49, 51 which are arranged opposite one another and have a starting slope 52, 53 in the radial direction. The corresponding receptacles 54, 56 likewise have a receiving slope 57, 58 adapted to the driver or entrainer slope 52, 53.

In a further preferred embodiment, provision is made for each disk ring 33 to 36 to have, respectively, three drivers or entrainers 37, 38 which are arranged at an angle of 120° to one another and which are mounted so as to be axially movable, respectively, with small play, between the driver or entrainer 37, 38 and the receptacles 39, 43.

During the closing or clamping of the multi-disk clutch 32, the disk rings 33 to 36 are displaced in the receiving grooves as a result of axial force action, until the disk rings come into frictional contact with the disk rings adjacent thereto, respectively. Due to the obliquely running receiving grooves, the drivers or entrainers come into working contact with the working side of the receptacles in the circumferential direction. Due to the starting slopes, radial play between the drivers or entrainers and the receptacles is forced out by the direction of rotation of the disk rings produced in the circumferential direction. In an arrangement of the drivers or entrainers with a phase offset of 120°, no radial play occurs.

We claim:

1. A device for frictionally coupling one force transmission element with a further force transmission element, comprising:
   a multi-disk clutch formed of at least four disk rings for adjusting a rotary position of the further transmission element in relation to the one force transmission element, said disk rings being axially displaceably mounted and, for both directions of rotation, having a backlash-free operative connection with the force transmission elements;
   a gearwheel having a journal extension;
   an adjusting gearwheel;
   said gearwheel and said adjusting gearwheel having a common seating region;
   a first receptacle provided at said common seating region for some of said disk rings; and
   a second receptacle provided at said common seating region for others of said disk rings.

2. The coupling device according to claim 1, wherein each of said disk rings has at least one driver.

3. The coupling device according to claim 2, wherein some of the drivers of said disk rings are directed radially inwardly, and some of the drivers of said disk rings are directed radially outwardly.

4. The coupling device according to claim 3, wherein said radially inwardly directed drivers engage in an axially parallel receptacle in said journal extension, and said radially outwardly directed drivers engage in an axially parallel receptacle in a ring gear.

5. The coupling device according to claim 3, wherein some of the drivers of some of the disk rings engage in an axially parallel receptacle in said journal extension, and some of the drivers of others of the disk rings engage in said axially parallel receptacle in a ring gear.

6. The coupling device according to claim 5, wherein others of the drivers of others of said disk rings engage in said axially parallel receptacle in said journal extension, and others of the drivers of others of the disk rings engage in said axially parallel receptacle in said ring gear.

7. The coupling device according to claim 3, wherein said drivers directed radially inwardly engage, respectively, in two threaded receptacles in said journal extension, and said drivers directed radially outwardly engage, respectively in two threaded receptacles in said adjusting gearwheel.

8. The coupling device according to claim 3, wherein two drivers arranged opposite one another are provided for each of said disk rings, each of said two drivers having a starting slope.

9. The coupling device according to claim 8, wherein said two drivers engage in two opposite receptacles in said adjusting gearwheel, and said two drivers engage in two receptacles in said journal extension.

10. The coupling device according to claim 1, wherein some of said disk rings are arranged so as to be shiftable independently of one another for a clockwise direction of rotation, and some of said disk rings are arranged so as to be shiftable independently of one another for a counterclockwise direction of rotation.

11. The coupling device according to claim 10, including an abutment arranged between said disk rings for clockwise rotational force transmission and said disk rings for counterclockwise rotational force transmission, and clamping devices operating independently of one another for shifting the various disk assemblies.

12. The coupling device according to claim 3, including spring elements disposed in said receptacles for augmenting the bearing contact of the drivers.

13. The coupling device according to claim 12, wherein said spring elements are selected from the group thereof consisting of compression springs, leaf springs, magnets, plastic material and rubber.

14. A reversing device of a sheet-fed rotary printing machine having installed therein a device for frictionally coupling one force transmission element with a further force transmission element, comprising a multi-disk clutch formed of at least four disk rings for adjusting a rotary position of the further transmission element in relation to the one force transmission element, said disk rings being axially displaceably mounted and, for both directions of rotation, having a backlash-free operative connection with the force transmission elements;

a gearwheel having a journal extension;

an adjusting gearwheel;

said gearwheel and said adjusting gearwheel having a common seating region;

a first receptacle provided at said common seating region for some of said disk rings; and a second receptacle provided at said common seating region for others of said disk rings.

* * * * *